US005252827A

United States Patent [19]

Koga et al.

[11] Patent Number: 5,252,827

[45] Date of Patent: Oct. 12, 1993

[54] METHOD AND APPARATUS FOR ANALYSIS OF GASES USING PLASMA

[75] Inventors: Masataka Koga; Toyoharu Okumoto; Hiromi Yamashita; Katuo Kawachi, all of Katsuta; Yukio Okamoto, Sagamihara, all of Japan

[73] Assignee: Hitachi, Ltd., Tokyo, Japan

[21] Appl. No.: 753,633

[22] Filed: Aug. 30, 1991

[30] Foreign Application Priority Data

Aug. 31, 1990 [JP] Japan ................................ 2-228134

[51] Int. Cl.[5] ........................ B01D 59/44; H01J 49/00

[52] U.S. Cl. .................................. 250/281; 250/282; 250/252.1

[58] Field of Search ........ 250/281, 282, 288, 252.1 R; 313/111.81

[56] References Cited

U.S. PATENT DOCUMENTS

| | | | |
|---|---|---|---|
| 4,148,612 | 4/1979 | Taylor et al. | 356/316 |
| 4,948,962 | 8/1990 | Mitsui et al. | 250/288 |
| 4,955,717 | 9/1990 | Henderson | 250/288 |
| 5,130,537 | 7/1992 | Okamoto et al. | 250/281 |

*Primary Examiner*—Bruce C. Anderson
*Attorney, Agent, or Firm*—Antonelli, Terry Stout & Kraus

[57] ABSTRACT

In the analysis of a specimen gas for at least one impurity, the specimen is fed to a microwave-induced plasma and the plasma is analyzed for the impurity. The plasma is formed by gases fed to it via an inner tube and an outer tube around said inner tube. The specimen is fed in undiluted form via the inner tube and a second gas which may be a standard gas is fed via the outer tube. The specimen gas and the second gas have compositions which are the same as to at least 75% by volume, e.g. are both air. A variety of analysis processes is made available.

27 Claims, 7 Drawing Sheets

METHOD AND APPARATUS FOR ANALYSIS OF GASES USING PLASMA

BACKGROUND OF THE INVENTION

1. Field of the Invention

The present invention relates to methods of analysis of specimen gas for at least one impurity, by feeding specimen gas to a plasma and analyzing the plasma for the impurity, and also to apparatus for carrying out such a method. The invention is especially suitable for the analysis of a gas containing an impurity in a very small concentration, typically of the order of 10 nanograms per liter or less and even one nanogram per liter or less. The impurity may be a gaseous impurity or may take the form of small solid particles distributed in the gas.

2. Description of the Prior Art

There have been many prior proposals for the analysis of gas specimens using high temperature plasma. A general discussion is to be found in "Basic and Applied in ICP Spectroscopic Analysis", Haraguchi, Kodansha, pages 91–95, (1986) (in Japanese). This publication describes apparatus which combines plasma producing means and an optical spectrometer or a mass analyzer. Plasma producing means mentioned include a high frequency inductively coupled plasma (ICP) device and a microwave induction plasma (MIP) device. Details of the devices are not given.

JP-A-1-309300 (corresponding to U.S. Pat. No. 4933650) describes a microwave plasma generating apparatus used for analyzing a component present at low concentration in an aerosol derived from a liquid. A gas for supporting the plasma and a carrier gas for the sample containing the aerosol produced by means of a nebulizer are fed to the plasma zone through the outer tube and the inner tube of a double tube structure respectively. The gases fed in both the tubes of the plasma device are said to be helium, nitrogen, argon etc. The plasma is energized at the plasma zone by microwave power fed to it by a waveguide. The plasma causes ionization, so that the plasma generating device may be combined with a mass spectrometer or an optical emission spectrometer, for analysis of the desired component.

JP-A-2-110350 discloses a method of analyzing an impurity element contained in a highly pure gas using ICP. A gas sample to be analyzed is fed to the plasma zone in a low concentration in argon as a carrier gas via a center tube, and two tubes surrounding the center tube also supply argon to the plasma zone. The ions produced by the plasma are analyzed by optical spectroscopy or mass spectrometry. The gas sample is typically a chlorosilane.

The first two prior art disclosures mentioned above do not describe methods of analyzing a gas specimen as such. The first document describes the reduction of an element to be analyzed to form a volatile hydride, and the second describes the analysis of an aerosol in a carrier gas, the aerosol therefore being formed from a solution containing the element to be analyzed. The third prior art document describes the production of an argon plasma and the use of argon as a carrier gas to carry the gas specimen to the plasma.

SUMMARY OF THE INVENTION

An object of the present invention is to provide a method for analyzing a gas specimen using plasma, in which the gas specimen is fed directly to the plasma without destabilization of the plasma.

Another object of the present invention is to provide a method for analyzing a gas specimen in which an expensive carrier gas such as argon is not required.

A further object of the present invention is to provide a method of continuously analyzing an atmosphere for an impurity, particularly in the case where the atmosphere is air or nitrogen. A very high degree of purity of air or nitrogen is required by for example the semiconductor manufacturing industry.

The present inventors have realized that a plasma generating device such as is shown for example in JP-A-1-309300 can be applied to the analysis of an impurity in a specimen gas, with the direct supply of the specimen in undiluted form to the plasma zone. Particularly, the invention can be applied to the analysis of gas specimens in the form of air or nitrogen, e.g. specimens derived from an atmosphere of air or nitrogen which requires to be continuously or frequently monitored.

Since the microware induced plasma device can sustain a plasma without use of argon, the outer tube of the double tube device can pass a plasma forming gas which has predominantly the same composition as the gas specimen fed in the inner tube. This concept provides various useful processes for analysis of specimens.

The invention therefore provides a method of analysis of a specimen gas for at least one impurity, wherein the specimen gas is fed in undiluted form to a plasma and the plasma is analyzed for the impurity. The plasma is formed by gases fed to it via an inner tube and at least one outer tube around the inner tube. The specimen gas being fed via the inner tube and a second gas is fed via the outer tube, said specimen gas and said second gas having compositions which are the same as to at least 75% by volume.

Preferably before and/or after the specimen gas is fed to the plasma and without interruption of the plasma, a third gas is fed to the plasma via the inner tube. This third gas has a known concentration of the impurity and has a main composition which is substantially the same as the main composition of said specimen gas. This third gas may have essentially zero concentration of the impurity or a fixed, known non-zero concentration of the impurity. Preferably gases of both these types are fed, for calibration.

The method according to the invention is especially useful when the specimen gas is selected from air and nitrogen. The plasma is preferably analyzed for at least one element selected from sulfur, boron, chlorine, fluorine, phosphorus, aluminum and arsenic.

In another aspect, the invention provides a method of analysis of a specimen gas for at least one impurity, wherein the specimen gas is fed to a plasma and the plasma is analyzed for the impurity. The plasma is formed by gases fed to it via an inner tube and at least one outer tube around the inner tube. The specimen gas is fed via the inner tube and a second gas is fed via the outer tube. The second gas is selected from air and nitrogen and the specimen gas and the second gas have compositions which are the same as to at least 75% by volume. The specimen gas may also be selected from air and nitrogen.

In this method, the specimen gas and the second gas both may originate from one atmosphere. While the second gas is fed to the plasma, a third gas is fed to the plasma via the inner tube before and/or after the specimen gas without interruption of the plasma, the third gas having a known concentration of the impurity.

In a further method embodying the invention, the specimen gas is fed to a microwave induced plasma and the plasma is analyzed for the impurity. The specimen gas and a second gas having compositions which are the same as to at least 75% by volume, are fed through the inner and outer tubes respectively. Preferably the specimen gas and the second gas have substantially the same main composition. Preferably the specimen gas is fed in undiluted form to the microwave induced plasma.

In yet another method of the invention gases are fed to a plasma and the plasma is analyzed for an impurity, said plasma being formed by gases fed to it via an inner tube and at least one outer tube around the inner tube. A specimen gas is fed through the outer tube while, without interruption of the plasma, the specimen gas and at least one further gas having a known concentration of said impurity are fed to the plasma via the inner tube in a sequence.

In another aspect, the invention provides a method of monitoring concentration of at least one impurity in an atmosphere selected from air and nitrogen, using a plasma analyzer having means for forming a plasma including an inner tube and an outer tube around the inner tube for feeding gas to a plasma region and means for analyzing amounts of the impurity in the plasma. The method comprises continuously feeding gases via the tubes while maintaining the plasma, all the gas fed to each tube respectively having substantially the same main composition, and all the gas fed to the two tubes having the same composition as to at least 75% by volume. A plurality of gases are fed to a first one of the tubes in a repeating sequence comprising at least (a) a first gas comprising gas taken from said atmosphere and (b) at least one second gas comprising a gas having a known concentration of the impurity. In this repeating sequence, preferably the duration of feeding of the first gas via the first tube is at least two-thirds of the total time. The first tube is preferably the inner tube.

In its apparatus aspect, the invention provides apparatus for analyzing an impurity in a gas, comprising (a) means for forming a plasma at a zone therein including a multiple tube structure for delivering at least two gases simultaneously to the plasma zone, the tube structure comprising an inner tube and at least one outer tube around the inner tube, (b) means for analyzing the plasma for the impurity, (c) gas conduits having flow regulating means connected to the inner and outer tubes and arranged for supplying gases thereto selectively from at least two gas sources including a source of said gas having said impurity to be analyzed, and (d) control means for the flow regulating adapted and arranged to cause a sequence of gases to flow to the plasma through at least the inner tube while the plasma is maintained continuously, the sequence of gases including the gas having the impurity to be analyzed in undiluted form.

As mentioned above, it is required in the invention that the gases fed through respectively the inner and outer tubes to the plasma zone have compositions which are the same in respect of at least 75% by volume. Thus for example nitrogen and air can, in certain cases, be fed through these two tubes, since air contains more than 75% nitrogen. It is furthermore required in some aspects of the invention as set out above that two gases fed to the plasma zone have substantially the same main composition. This means that essentially the two gases have the same composition, apart from components present in very minor amounts such as the impurities to be analyzed. Thus any differences between the compositions of the two components having the same main composition are not such as to affect the behavior of the plasma. For example, in the case of air, two samples of air may vary slightly in for example carbon dioxide content, but the main components of air, nitrogen, oxygen and inert gases, remain substantially the same. Thus for air it can be said that the requirement that the main composition remains the same amounts preferably to at least 99% of the composition being identical, and the same applies to a nitrogen gas.

Preferably the ratio of rate by volume of gas fed to the centre tube of the plasma device to that of gas fed to the outer tube or tubes is 5 to 20%, e.g. about 10%.

It is needed to prepare a standard gas to quantitatively analyze the impurity component in the gas specimen. The standard specimen, however, can be prepared to a desired concentration by adding a gas substance corresponding to the element of the component to be measured to a gas which has the same main composition as the specimen gas. It is preferable to use air which is a mixture of nitrogen and oxygen or nitrogen gas as this main composition for the gas specimen to be measured. The gaseous substances which may be added to the the gas of the main composition to form the standard gas of known impurity concentration are preferably gaseous at room temperature, including for example: $H_2$ and $H_2S$ for measuring H, He for He, $BF_3$ and $B_2F_6$ for B, CO and $CO_2$ for C, $N_2$ and $NO_2$ for N, $O_2$ for O, $F_2$ for F, Ne for Ne, $SiH_4$ for Si, $PH_3$ for P, $SiH_4$ for Si, $H_2S$, $SO_2$ and COS for S, $Cl_2$ for Cl, Ar for Ar, $GeH_4$ for Ge, Kr for Kr, $SnH_4$ for Sn, $TeF_6$ for Te, and Xe for Xe.

As mentioned, there is a need in the semiconductor production industry to check the contamination of air or nitrogen atmospheres. For this purpose, measurement is made of impurity components such as boron (B), fluorine (F), sulfur (S), chlorine (Cl), phosphorus (P), aluminum (Al), and arsenic (As). One or more components can be selected for analysis from among these. In order to use the mass spectrometer for detection when air is the specimen to be measured, Ne, He, or Ar contained in the air as stable trace elements can be used for mass calibration.

When air or nitrogen or another specimen is available in a large amount as the gas to be measured, this gas can be fed in itself into the outer tube of the plasma device as a plasma forming gas. This can decrease the running cost to a great extent. In this case, the measured signal obtained at any time is due to the air measured. However, there is a difference from the signal measured when standardized air or the air not containing the impurity to be measured is fed into the inner pipe. This signal difference is available for quantitative analysis of the component measured.

BRIEF INTRODUCTION OF THE DRAWINGS

Embodiments of the invention will now be described by way of non-limitative example with reference to the accompanying drawings, in which.

Figure 1:
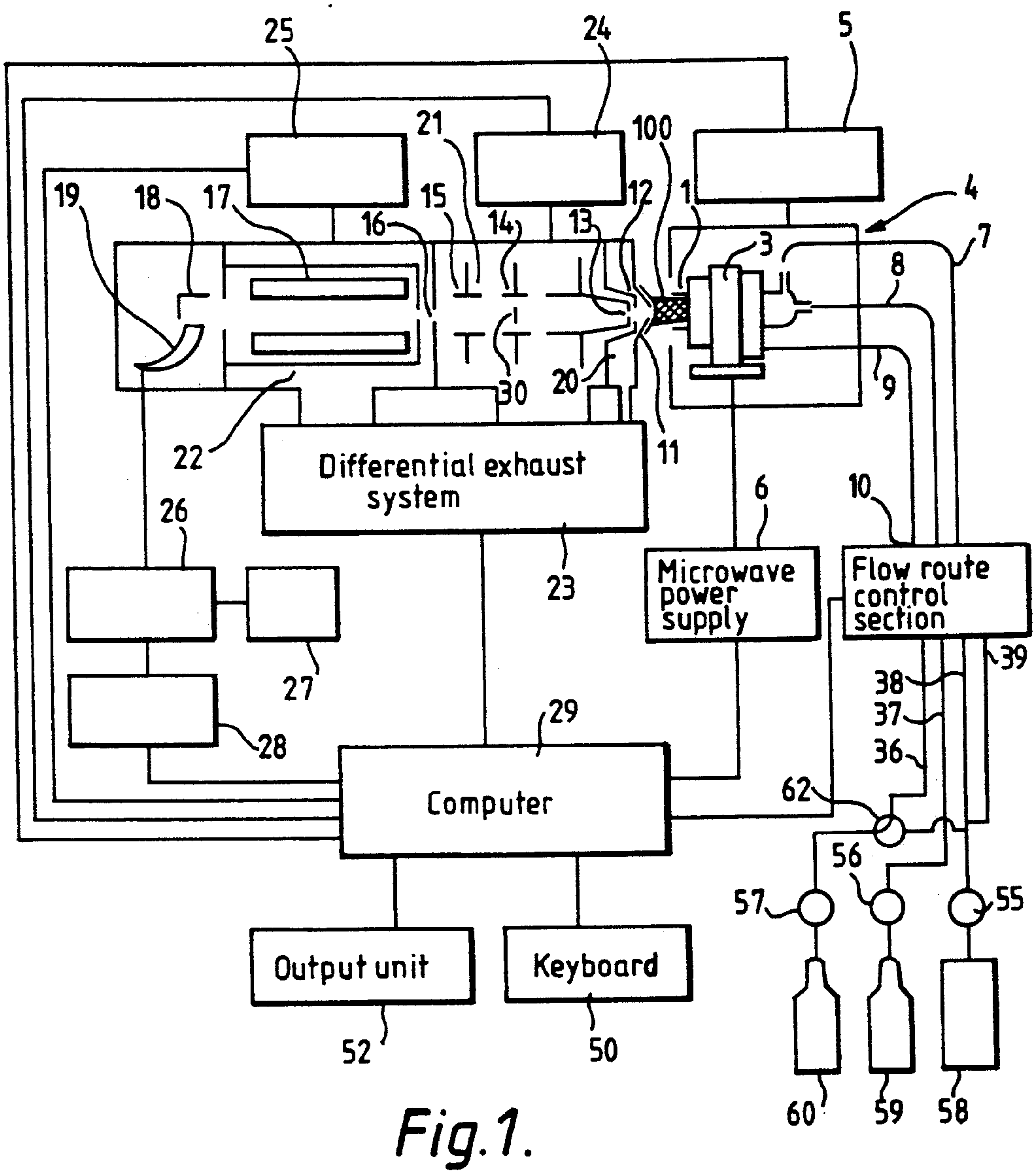
FIG. 1 is a block diagram of a microwave induced plasma mass spectrometer (MIP-MS) gas analyzing apparatus which is an embodiment of apparatus according to the present invention.
Figure 2:
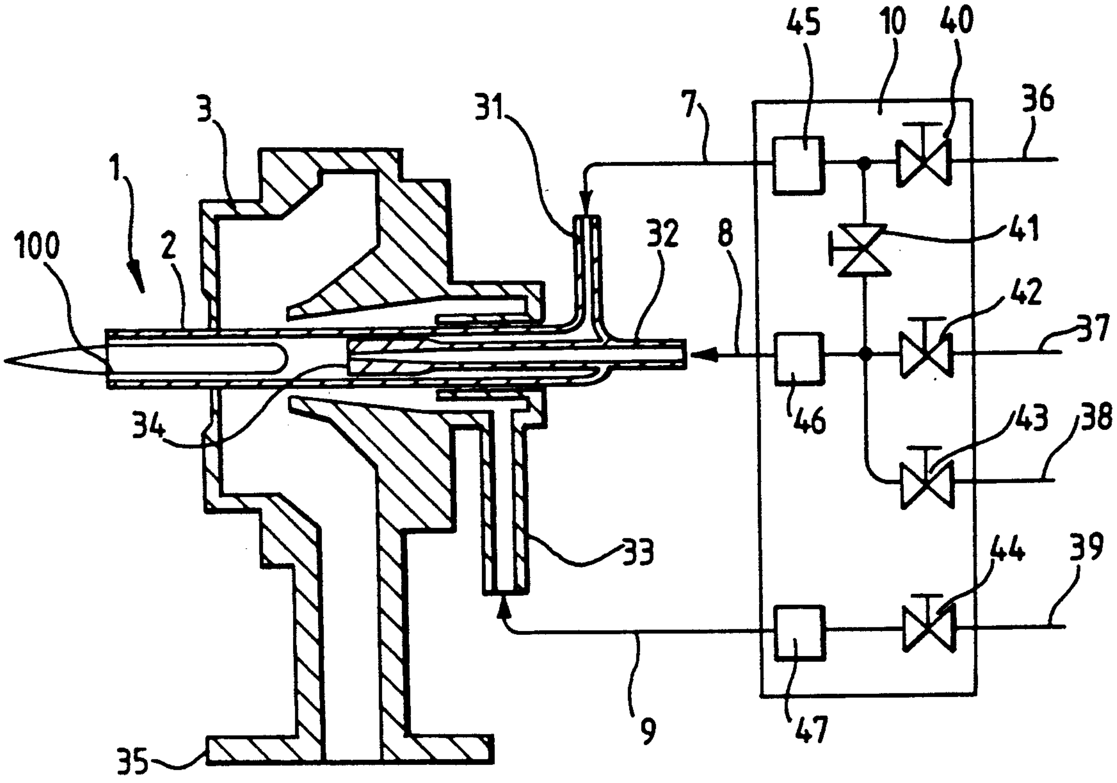
FIG. 2 is a detailed part-sectional diagram of the microwave plasma section and flow route control section of the apparatus shown in FIG. 1.
Figure 3A:
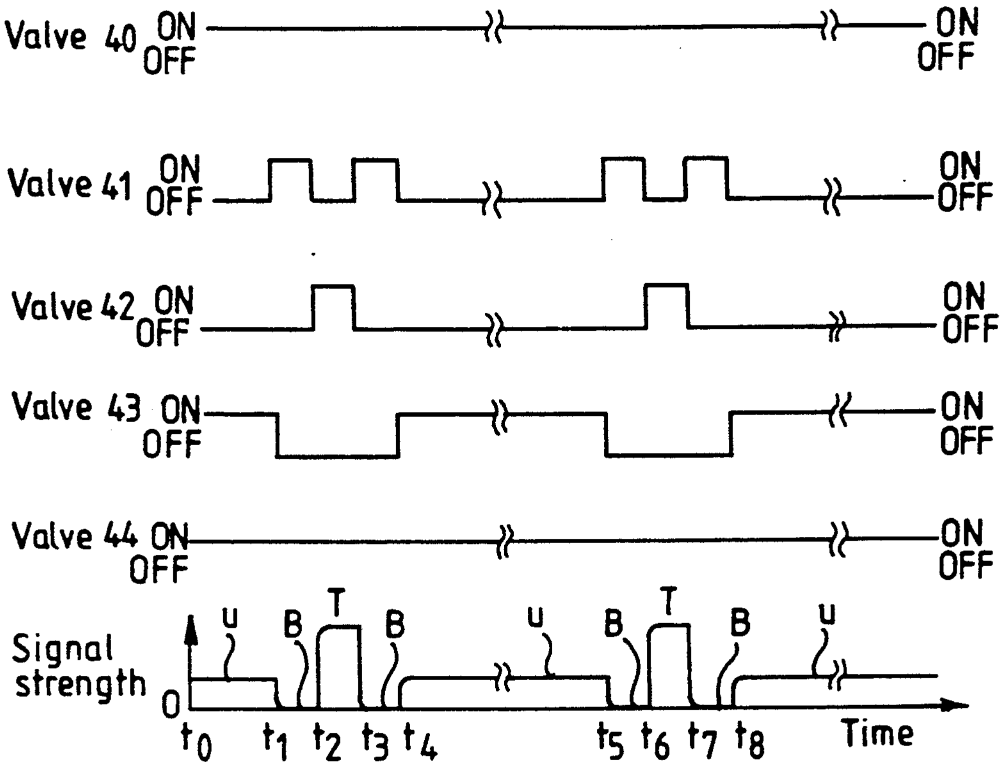
Figure 3B:
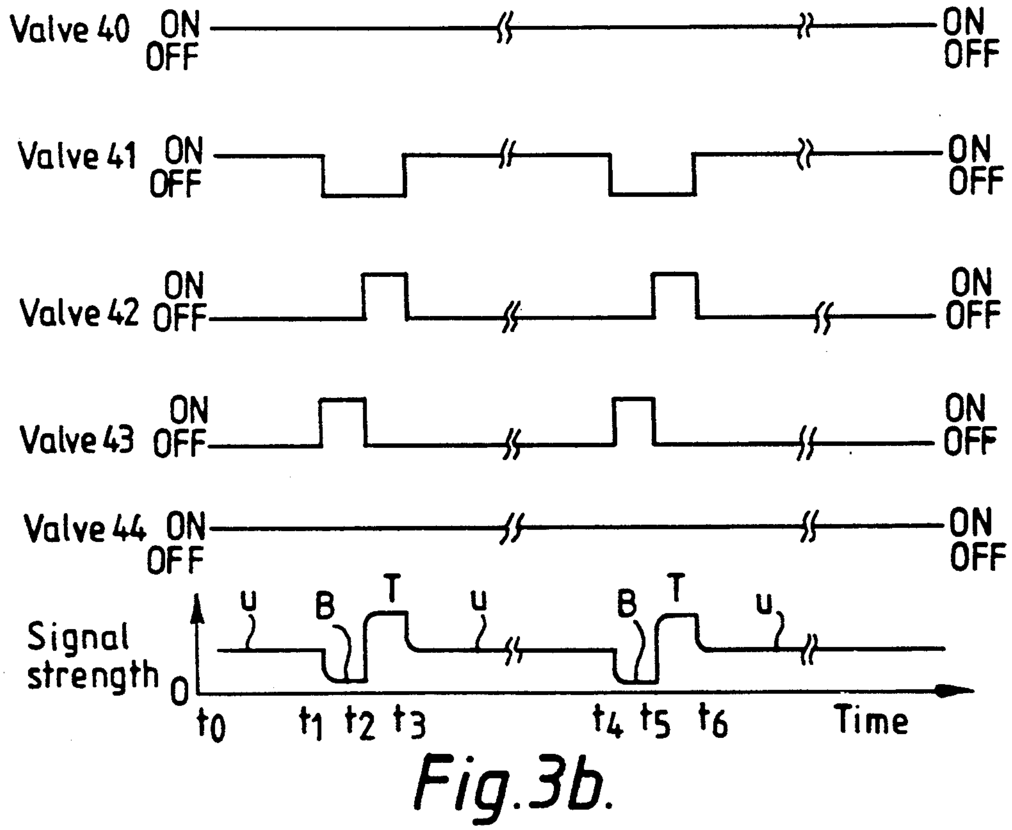
Figure 4A:
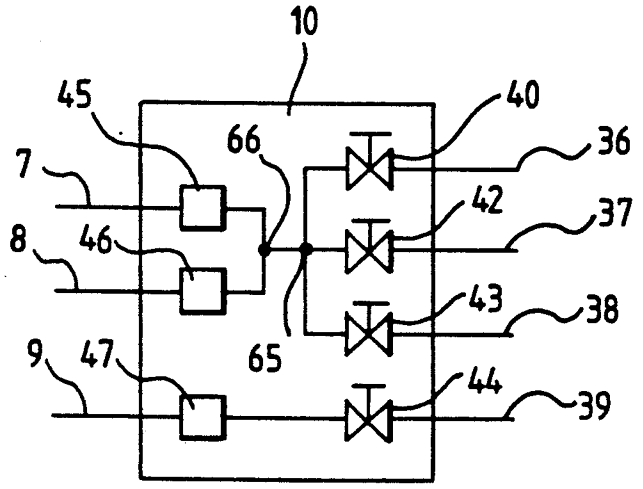
Figure 4B:
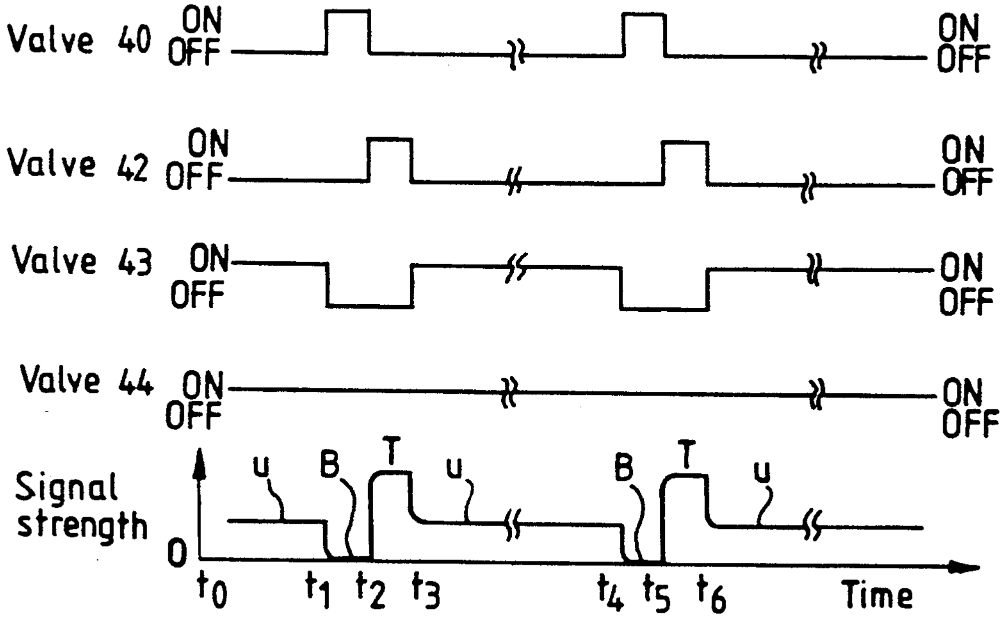
Figure 5A:
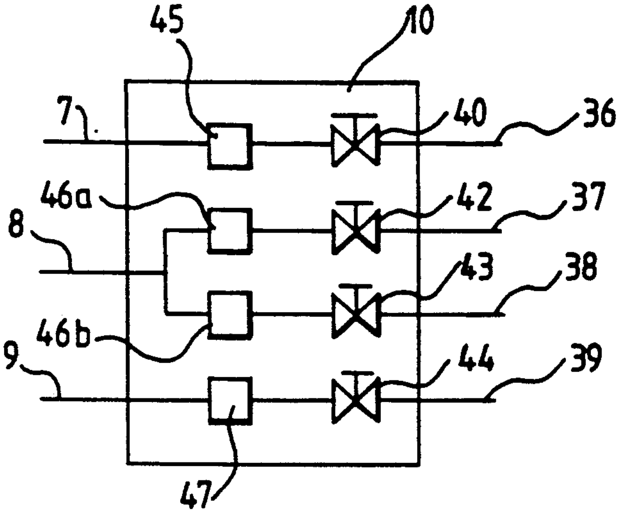
Figure 5B:
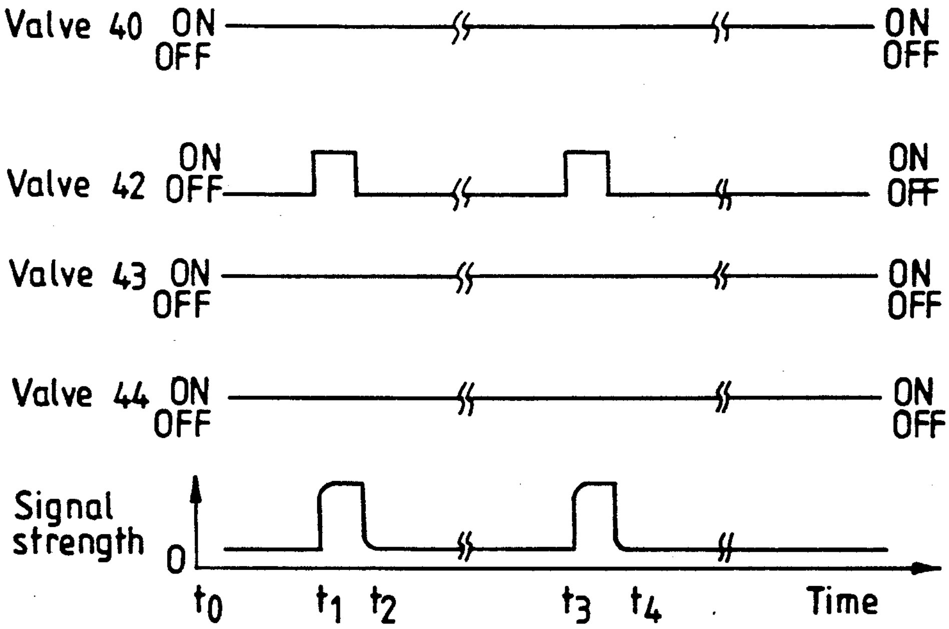
Figure 6A:
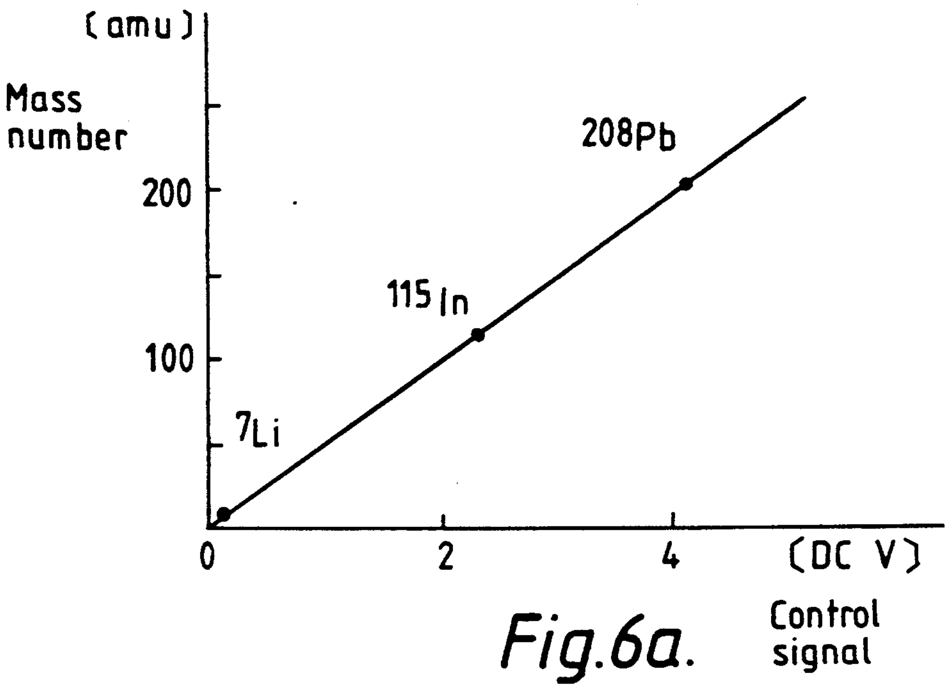
Figure 6B:
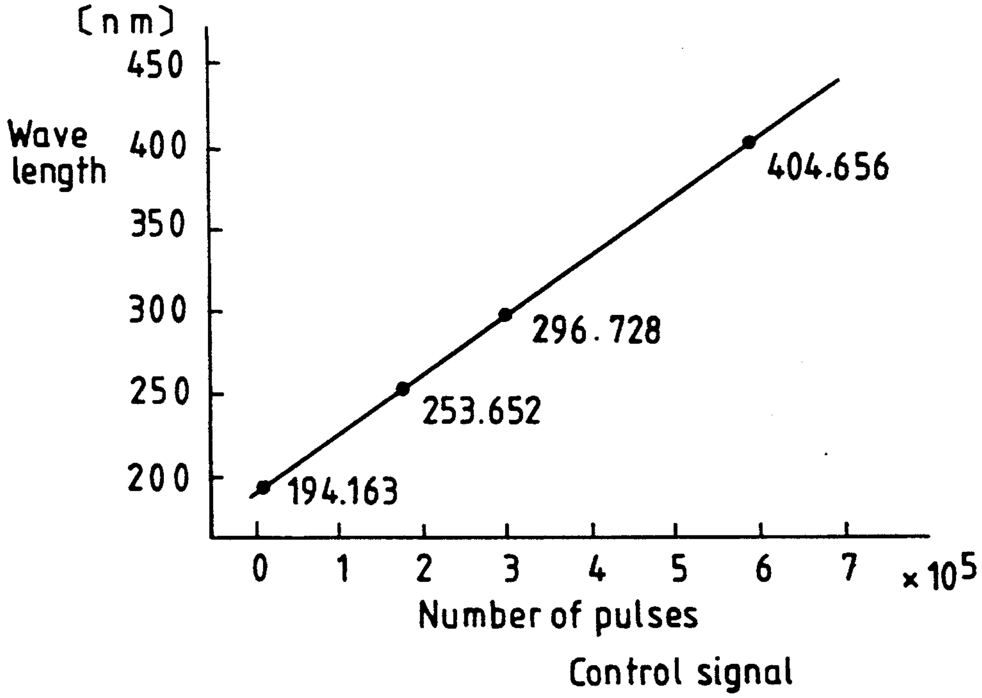
Figure 7A:
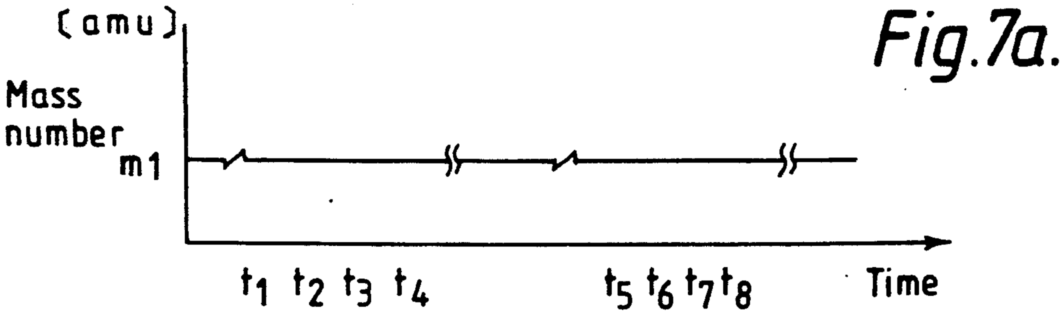
Figure 7B:
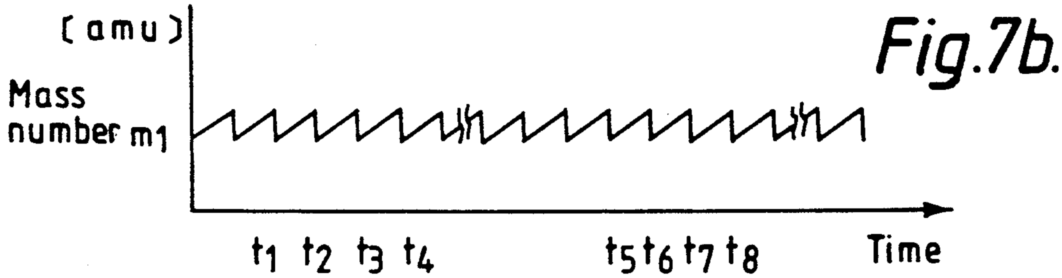
Figure 7C:
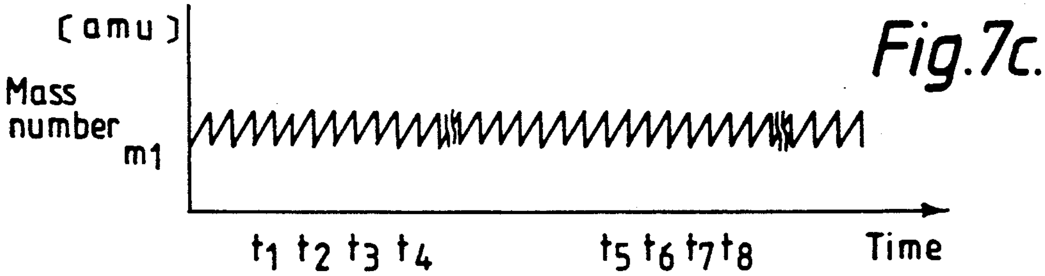
Figure 7D:
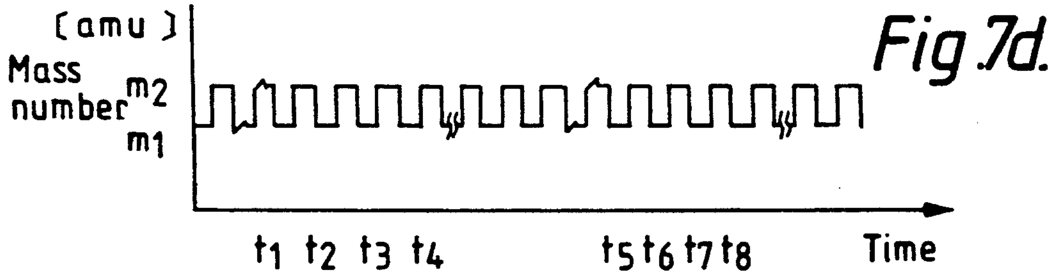
Figure 7E:
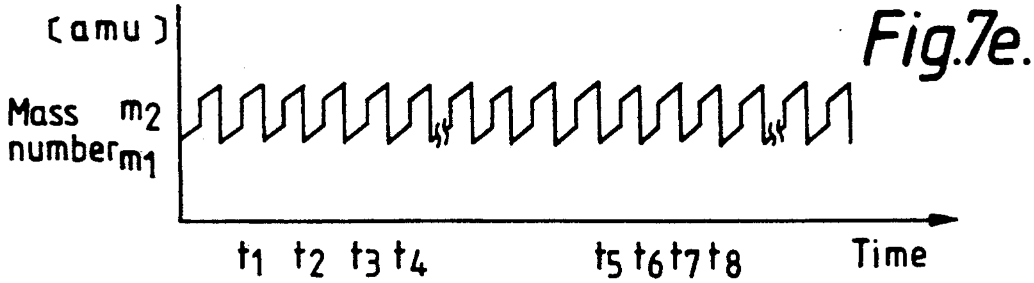

FIGS. 3(*a*) and 3(*b*) are measuring sequences embodying the invention using the flow paths of FIG. 2;

FIG. 4(*a*) is an alternative example of the flow route construction within the flow route control section of FIG. 1;

FIG. 4(*b*) is a measuring sequence diagram for a method embodying the invention using the construction of FIG. 4(*a*);

FIG. 5(*a*) is another alternative example of the flow route construction within the flow route control section of FIG. 1;

FIG. 5(*b*) is a measuring sequence diagram for a method of the invention using the construction in FIG. 5(*a*);

FIG. 6(*a*) is a graph illustrating a calibration method for mass number;

FIG. 6(*b*) is a graph illustrating a calibration method for light emitting spectroscopic analysis; and FIGS. 7(*a*) to 7(*e*) are illustrations of mass number scanning methods which can be used in embodiments of the invention.

DESCRIPTION OF THE PREFERRED EMBODIMENTS

The embodiments given here are examples using air as the gas specimen to be analyzed by an MIP-MS having a microwave induced plasma device (MIP) which excites plasma and having a mass spectrometer (MS) which is a detection device. The invention is not limited to these embodiments.

FIG. 1 is an overall block diagram illustrating an embodiment of the present invention. A plasma torch 1 is formed of heat-resisting material such as quartz. It produces plasma 100 which emerges from its inside to extend outside. As described below the gas specimen is introduced into the plasma 100 via an inner tube, and decomposed or dissociated in the plasma so that it is atomized or ionized thermally and chemically.

Electric power needed to form the plasma is supplied from a microwave power supply 6 to a microwave cavity 3 around the torch 1. The MIP section 4 having the plasma torch 1 and the microwave cavity 3 can be finely adjusted in the X, Y and Z axis directions to align with a sampling cone 11 which is an inlet for a mass analyzer 17 in the form of a mass spectrometer. The movement of the MIP section 4 is controlled by a position control unit 5.

The MIP section 4 has three kinds of gas fed in to it. A flow route 7 feeds a main plasma forming gas which serves to primarily form the plasma and as described below exits from an external outer tube of the plasma torch 1. A flow route 8 feeds the gas which exits from the inner tube of the plasma torch 1. This gas also contributes to forming the plasma. A flow route 9 feeds a cooling gas for cooling the plasma torch 1. This gas does not enter the plasma. Gas selection and gas flow rates can be controlled by a flow route control section 10.

The ions generated by the plasma 100 are taken into a first differential exhaust chamber 20 of a vacuum system by the sampling cone 11. In turn, they are made to enter a second differential exhaust chamber 21 and are transported by an accelerating electrode 13, a first ion lens 14, and second ion lens 15. As the plasma 100 usually generates a large number of high energy photons, a photon stopper 30 is provided to minimize the signal background. The ions, in turn, pass through an aperture 16 to enter a final differential exhaust chamber 22. The mass analyzer 17 selects only the ion of a predetermined mass number. The selected ion is injected by a deflecting electrode 18 into a multiplier 19 in which it is amplified and converted to electric signals. The mass analyzer can be controlled to scan several mass numbers, if it is desired to analyze several different ions at the same time.

The accelerating electrode 13, the first ion lens 14, the second ion lens 15 and the photon stopper 30 have respective appropriate voltages applied thereto by an ion lens controller 24. The mass analyzer 17 has the mass number of the ion to be transmitted and its mass number resolution controlled by a mass analyzer control section 25. All three of the differential exhaust chambers 20, 21, 22 are exhausted to vacuum by a differential exhaust system 23.

The multiplier 19 is used in a pulse counting mode of operation. Its output signal is waveform shaped by a pulse amplifier 26 having a signal discrimination feature, and enters through a counter 28 to a computer 29 for control and arithmetic operation which counts number of the ions of the given mass number. It is desirable that the pulse amplifier 26 has a rate meter 27 added thereto. The computer 29 controls not only the counter 28, but also operations of the differential exhaust system 23, the mass analyzer control section 25, the ion lens controller 24, the microwave power supply 6, the position control unit 5 and the flow route control section 10.

The mass analyzer 17 used in FIG. 1 is a tetrode mass spectrometer. It, however, may be replaced by for example any of a magnetic sweeping type, ion trap type, flying time type and ion cyclotron resonance type. The multiplier 19 can be used in an ion current measuring mode for measurement in place of the pulse counting mode of operation. The constructions of the ion lens system, the photon stopper, and the ion feeding system to the vacuum system are not limited to those shown in the figure.

Conditions for the analyzing apparatus shown in FIG. 1 can be set in the computer 29 through a keyboard 50 or similar input unit using directions given by an operator. The computer 29 can control all functional sections on the basis of the desired conditions. Results obtained through detectors such as the mass analyzer 17 can be arithmetically processed by the computer 29 to feed out to an output unit 52 having a monitor, a printer and/or a recorder.

The flow route control section 10 is connected with various gas sources. To give examples, a gas specimen pressure source 58 used is a compressor which can feed to the analyzing apparatus the air to be measured as an undiluted specimen. A standard air having $SO_2$ of predetermined concentration mixed therein is stored in a vessel 59. There are provided a plurality of such standard vessels depending on compositions and concentrations to be measured as necessary. There is also provided a desulfurized air vessel 60 which has a desulfurized air (clean air) as reference for zero-point measurement. These gas sources have flow rate control means 55, 56 and 57, respectively. A plasma gas flow route 36 has a switching valve 62 which can selectively communicate either the desulfurized air vessel 60 or the gas specimen pressure source 58 to the flow route control section 10.

The flow route control section 10 is connectible with the gas specimen pressure source 58 through the sample gas flow route 38, with the vessel 59 through the standard gas flow route 37, and with the desulfurized air vessel 60 through the plasma gas flow route 36. The sample gas flow route 38 has a branch which is connected to the flow route control section 10 as a cooling gas flow route 39.

FIG. 2 is a detailed illustration of the MIP section 4 and one arrangement of the flow route control section 10 of the analyzing apparatus shown in FIG. 1. As the figure shows, the plasma torch 1 has a double-wall structure so that it has a central inner tube 34 and an outer tube 2 surrounding it coaxially. The microwave power from the microwave power supply 6 (FIG. 1) is fed to the microwave cavity 3 via a waveguide having a waveguide connection port 35. This allows the plasma 100 to be formed in the torch by the plasma forming gas from the outer tube 2 and the center gas from the inner tube 34.

Describing now the specific example of analysis of air using the gases already described above, the desulfurized air from the plasma gas flow route 36 connected with the flow route control section 10 is fed from an outer tube inlet 31 into the outer tube 2 through an electromagnetic valve 40, a flow rate controller 45 and the flow route 7. The standard air from the standard gas flow route 37 is fed from the inner tube inlet 32 into the inner tube 34 through a electromagnetic valve 42, a flow rate controller 46 and the flow route 8. The air to be measured from the sample gas flow route 38 is fed from the inner tube inlet 32 to the inner tube 34 through an electromagnetic valve 43, a flow rate controller 46 and flow route 8. The electromagnetic valves 42 and 43 can be controlled by the computer 29 so that each one is closed when the other is open.

The cooling air from the cooling gas flow route 39 is fed from the cooling gas inlet 33 into the microwave cavity 3 through an electromagnetic valve 44, a flow rate controller 47 and the flow route 9 to cool the outside of the outer tube 2. In the flow route control section 10 shown in FIG. 2, there is provided a bypass having an electromagnetic valve 41 extending between the flow path from the electromagnetic valve 40 to the flow rate controller 45 and the flow path from the electromagnetic valve 42 to the flow rate controller 46. When one of the electromagnetic valves 41, 42 and 43 is open, one of the desulfurized air, the standard air, and the air to be measured is selectively fed into the inner tube 34 to become the center gas.

Next there are described examples of measuring sequences with reference to FIGS. 3(*a*) and 3(*b*) when the flow route control section 10 of the analyzing apparatus shown in FIG. 1 is constructed as shown in FIG. 2. As an example, sulfur (S) present in a small amount in an air atmosphere is measured. Sulfur contained as an impurity in air is present primarily as sulfur oxides such as $SO_2$ and $SO_3$. In the example, therefore, there was used standard air which contained sulfur as $SO_2$ gas in a predetermined concentration.

In the measuring sequence shown in FIG. 3(*a*), the electromagnetic valve 40 of the flow route control section 10 shown in FIG. 2 was kept open, or opened, and the desulfurized air as the main plasma gas was fed to the outer tube 2 at a predetermined flow rate. The valves 41 and 42, on the other hand, were initially kept closed, and the valve 43 was opened to feed the undiluted sample air to be measured to the inner tube 34 at a predetermined flow rate, thereby forming the plasma 100 of these gases. Not shown, but present in a conventional manner, is an ignition device for starting the plasma. Start-up may use argon as the plasma gas, since this is more easily ignited into a plasma. We are here concerned, however, with the sequence after a stable plasma is achieved. The valve 44 is kept open to supply cooling gas.

When the plasma 100 is formed in a stable state, it is possible to obtain an ion intensity signal u from the mass spectrometer for a period between instants $t_0$ and $t_1$ as shown in FIG. 3(*a*). The signal u then is stored in a memory of the computer 29. When the electromagnetic valves 42 and 43 are closed between instants t1 and t2 and at the same time, the electromagnetic valve 41 is opened in turn, the desulfurized air is supplied from the flow route 36 to the inner tube 34 only. The gas forming the plasma 100, however, is not changed in its main composition so that the plasma 100 is stable, not changing the sensitivity. As the gas fed to the inner tube has no sulfur compounds, an ion intensity signal B obtained is stored in the memory of the computer 29 as zero-point measured value. For a period from $t_2$ to $t_3$, the electromagnetic valves 41 and 43 are closed and the electromagnetic valve 42 is open. This allows only the standard air to flow from the standard gas flow route 37 to the inner tube 34 as the center gas. As the main composition of the gas forming the plasma still has not changed, the plasma 100 remains a stable flame. An ion intensity signal T obtained during this period is stored in the memory of the computer 29 as standard specimen measured value.

For a period from $t_3$ to $t_4$, the electromagnetic valves 42 and 43 are closed again, and the electromagnetic valve 41 is open. The desulfurized air is fed to the inner tube 34. The ion intensity signal B obtained during this period also is stored in the memory of the computer 29. For a period from $t_4$ to $t_5$, the electromagnetic valves 41 and 42 are closed, and the electromagnetic valve 43 is open. This allows only the measured air to flow from the sample gas flow route 38 to the inner tube 34. The ion intensity signal u obtained at this time is stored in the memory of the computer 29 as the specimen value to be determined.

The whole measuring cycle described above is repeated further after time $t_5$. The computer 29 calibrates compensates the measured values on the basis of the clean air zero-point value B and the standard measured value T obtained in each measurement cycle. It then calculates the concentration of the sulfur contained in the measured air from the data for the specimen value u, and causes the output unit 52 to display results.

In order to obtain more precise results, the computer 29 may be made to find the average of a plurality of measurements of each of the standard measured value T and the specimen value u. It may then calculate and output the concentration of the impurities in terms of the averages. The operator can select a desired one of the calculations to output by instructing the computer 29 in advance using the keyboard 50.

The process can be used for continuous on-line monitoring of an air atmosphere, e.g. a clean air atmosphere in semiconductor manufacture, by continuous measurement of value u interrupted at intervals by brief measurement of the calibrating values B and T.

In actual measurement of a specimen using the analyzing apparatus shown in FIG. 1, both the mass number and signal strength have to be calibrated so that the apparatus can not only read the ion intensity signal, but also check that the mass number being monitored corresponds to the peak in the mass spectrum for $S^+$ which is ion of sulfur, when the standard air is measured for the periods of $t_2$ to $t_3$ and $t_6$ to $t_7$.

FIG. 3(*a*) illustrates above the example of measurement of a single element (sulfur). Alternatively, measurement of a plurality of impurity components in a specimen can be made by setting the mass analyzer 17 to a condition for detection of the plurality of impurity components by comparison with prepared gases having standard amounts of the respective impurities and no impurity components respectively.

An alternative example of a measuring sequence with using of the flow route connections shown in FIG. 2 is described now with reference to FIG. 3(*b*). In this measuring sequence, the gas specimen pressure source 58 and the desulfurized air container 60 in the gas supply system in FIG. 1 are exchanged so that the desulfurized air is fed to the sample gas flow route 38, and the undiluted air to be measured is supplied to the main plasma gas flow route 36.

In the method of FIG. 3(*b*) the air to be measured should be kept supplied from the main plasma gas flow route 36 through the electromagnetic valve 40 and the flow rate controller 45 to the outer tube 2 continuously at a constant flow rate. On the other hand, the air to be measured is supplied from the main plasma gas flow route 36 through the flow rate controller 46 alone to the inner tube 34 at a constant flow rate, with the electromagnetic valves 42 and 43 kept closed and the electromagnetic valve 41 open. An ion intensity signal u, therefore, can be obtained during the period $t_0$ to $t_1$. The signal u is stored in the memory of the computer 29 as the specimen value.

For the period $t_1$ to $t_2$, the electromagnetic valves 41 and 42 are closed, and the electromagnetic valve 43 is open. The desulfurized air from the sample gas flow route 38, is fed alone through the electromagnetic valve 43 and the flow rate controller 46 to the inner tube 34. The ion intensity signal B obtained is stored in the memory of the computer 29 as the clean air zero-point value.

For the period $t_2$ to $t_3$, the electromagnetic valves 41 and 43 are closed, and the electromagnetic valve 42 is open. The standard air from the standard gas flow route 37 is fed alone through the flow rate controller 46 to the inner tube 34. The ion intensity signal T obtained is stored in the memory of the computer 29 as the standard value.

For the period $t_3$ to $t_4$, the electromagnetic valves 42 and 43 are closed, and the electromagnetic valve 41 is open. The air to be measured from the main plasma gas flow route 36 is again fed through the electromagnetic valve 41 and the flow rate controller 46 t the inner tube 34. The ion intensity signal u obtained for the duration is stored in the memory of the computer 29 as another specimen value.

The measuring cycle described above is repeated further after time $t_4$. The computer 29 calibrates the measured values on the basis the zero-point value B and the standard value T. It also calculates the concentration of the sulfur contained in the measured air from the specimen value u, and causes the output unit 52 to display results. In the next measuring cycle, the zero-point value B is obtained between times $t_4$ and $t_5$, the standard value T is obtained between $t_5$ and $t_6$, and the specimen value u is obtained after $t_6$.

In the measuring sequence in FIG. 3(*b*), the air to be measured is always fed to the outer pipe 2 of the plasma torch 1 as the main plasma-forming gas. The ion intensity signal, therefore, does not become zero, or is a little higher than zero, even when the clean air containing no impurities is fed to the inner tube 34. This, however, causes no problems in the qualitative analysis as differences of the signals are taken in the process. If the specimen gas to be measured is air, and is available in a large amount, the plasma-forming main gas is consumed in an amount greater by an order of magnitude than the gas through the inner tube 34. Taking this into account, it is advantageous to use such air as the main plasma gas, to decrease running costs.

FIG. 4 shows an alternative construction of the flow route control section 10 different from that of FIG. 2 and a further measuring sequence. In FIG. 4(*a*), the main plasma gas flow route 36, the standard gas flow route 37, the sample gas flow route 38, and the cooling gas flow route 39 are connected to the respective gas supply sources as in FIG. 2. The flow routes 36, 37, and 38 are integrated at a point 65 to a single flow route. The integrated flow route is branched at a point 66 to the flow route 7 and the flow route 8. The flow route 7 connected to the outer tube inlet 31 has the flow rate controller 45, and the flow route 8 connected to the inner tube inlet 32 has the flow rate controller 46. The flow rate at the flow rate controller 45 is set to a certain ratio to that of the flow rate controller 46 so that the former is greater than the latter.

As shown in FIG. 4(*b*), for the period of time $t_0$ to $t_1$, the electromagnetic valve 43 is open, and the electromagnetic valves 40 and 42 are closed. Both the inner tube 34 and outer tube 2, therefore, receive the undiluted air to be measured from the sample gas flow route 38 to form the plasma 100. The ion intensity signal u obtained for this period is stored in the memory of the computer 29 as the specimen value.

For the period $t_1$ to $t_2$, the electromagnetic valves 42 and 43 are closed, and the electromagnetic valve 40 is open. The desulfurized air from the gas flow route 36, thus, is fed to both the inner tube 34 and the outer tube 2. The ion intensity signal B obtained is stored in the memory of the computer 29 as the zero-point value B.

For the period $t_2$ to $t_3$, the electromagnetic valves 40 and 43 are closed, and the electromagnetic valve 42 is open. The standard air containing a known amount of $SO_2$ from the standard gas flow route 37 is fed to both the inner tube 34 and outer tube 2. The ion intensity signal T obtained is stored in the memory of the computer 29 as the standard value T.

For the period $t_3$ to $t_4$, the electromagnetic valves 40 and 42 are closed, and the electromagnetic valve 43 is open. The air to be measured is fed to both the inner tube 34 and outer tube 2. The ion intensity signal u obtained is stored in the memory of the computer 29 as a further specimen value.

The measuring cycle described above is repeated further after time $t_4$. In the period $t_4$ to $t_5$ there is obtained the zero-point measured value B, for the period of $t_5$ to $t_6$ the standard specimen measured value T, and for the period after $t_6$ is the known specimen measured value u. The computer 29 calculates concentration of the impurity (sulfur compound) in the measured air on the basis of the measured values, and the output unit 52 displays the result.

FIG. 5 is another alternative construction of the flow route control section 10 different from that of FIG. 2 and a measuring sequence using it. In FIG. 5(*a*), the main plasma gas flow route 36 and the sample gas flow route 38 are supplied with the undiluted air to be measured. In other words, the switching valve 62 of the gas supply system shown in FIG. 1 is switched to the gas specimen pressure source 58 so that the air to be measured can be fed to the flow routes 36, 38, and 39.

The flow route control section 10 functions as follows. The air to be measured from the gas flow route 36 is fed continuously through the electromagnetic valve 40 and the flow rate controller 45 to the outer tube 2 of the plasma torch 1. The air to be measured from the sample gas flow route 38 is also be fed through the electromagnetic valve 43 and a flow rate controller **46*b* to the inner tube 34. The air from the cooling gas flow route 39 is fed through the electromagnetic valve 44 and the flow rate controller 47 to the microwave cavity 3. The standard air containing $SO_2$ of known concentration from the standard gas flow route 37 can be fed through the electromagnetic valve 42 and a flow rate controller 46*a* to the inner tube 34**.

As shown in FIG. 5(*b*), the period $t_0$ to $t_1$ is a preliminary stage. The electromagnetic valves 40, 43, and 44 are kept open, and the electromagnetic valve 42 is closed. The air to be measured is fed to both the outer tube 2 of the plasma torch 1 and the inner tube 34 to form the plasma 100.

For the period $t_1$ to $t_2$, the electromagnetic valve 42 also is open. A mixed gas of the air to be measured from the sample gas flow route 38 and the standard air from the standard gas flow route 37 is fed to the inner tube 34 of the plasma torch 1 through flow route 8. During the period, the flow rate controllers **46*a* and 46*b*** are adjusted so that sum of flow rates of the air to be measured and the standard air is equal to the desired constant flow rate of the gas fed through the inner tube.

For the period $t_2$ to $t_3$, the electromagnetic valve 42 is closed so that only the air to be measured is fed to the inner tube 34. Operation during the period $t_3$ to $t_4$ is same as during the period $t_1$ to $t_2$. The ion intensity signals of the measured air during the period $t_2$ to $t_3$ and after $t_4$ are compared with that of the mixture of the standard air and the measured air obtained during the periods $t_1$ to $t_2$ and $t_3$ to $t_4$ for calculation of amount of the impurity components in the measured air.

As a clean air measurement is not made according to the measuring sequence in FIG. 5, the measurement accuracy is lowered as compared with the preceding examples. Measurement, however, can be made with the electromagnetic valves 40, 43 and 44 eliminated so that the construction of the flow route control section 10 can be simplified.

In the flow route control section 10 in FIG. 1, a mass flow controller is preferable for the flow controllers used in FIGS. 2, 4(*a*), and 5(*a*).

The element to be measured contained in the standard gas can be fed in the form of fine solid particles, instead of in gaseous form, using a carrier gas. The diameter of the particle may be less than 1 micron, i.e. small enough that decomposition, dissociation and ionization occur in the plasma, although this depends on the temperature, axial length, and flow rate of the plasma.

Dry air contains many elements, particularly inert elements, including Ar, Ne, He, Kr, and Xe. These are used as mass calibration elements, or low cost standard gases are used for this purpose.

In the embodiments described above, one standard gas is used for calibration of both the signal strength and mass number. Different gases may however be used for each calibration. Alternatively, it is possible that the element contained in the standard gas may be different from the element to be measured. For the calibration of mass number, an element should be selected which is similar to the element to be measured in mass number. Differences of the dissociation potential and ionizing potential should be found for the molecules of the both elements in advance, and a difference of the ionizing efficiency also should be found for them in terms of the plasma temperature.

The following describes how to calibrate the mass number with reference to FIG. 6(*a*). The calibration of the mass number is controlled through the mass analyzer control section 25 by the computer 29. In the example of FIG. 6(*a*), the calibration is made at three points of light, intermediate and heavy masses. The elements selected are Li, In, and Pb. A sample containing these elements is fed to the plasma 100. The calibration mass numbers are 7, 115, and 208. If a tetrode mass analyzer is used, the computer 29 should apply a dc voltage to the mass analyzer control section 25 so that the ions passing through the mass analyzer 17 can be controlled. Functions often used for the calibration are polynomials such as a linear and quadratic forms. The number of calibration points used is not limited to three, or may be two or four.

The foregoing examples of measurement methods use the mass analyzing method, but may in a similar way use an optical spectroscopic analyzing method. The following describes, for the spectroscopic analyzing method, wavelength calibration with reference to FIG. 6(*b*). As a calibration light source, there is used a mercury lamp of which the bright lines are at wavelengths 194.163, 253.652, 296.728 and 404.656 nm. The wavelength of the spectroscope is controlled by the computer 29. Wavelength drive is by a pulse motor. A control signal is represented by number of pulses. For the calibration light source, there may be used a mercury lamp as mentioned, i.e. a source other than the plasma for analysis, or light from the plasma.

It may be difficult to add a desired element for the standard gas in a gas state at room temperature. For molecules existing in a liquid or solid state at room temperature, it is possible to control the temperature to control the vapor pressure in order to feed them as desired into the torch.

FIGS. 7(*a*) to 7(*e*) are examples of the mass number scanning method described with reference to the measurement method of FIG. 3(*a*). FIGS. 7(*a*) to 7(*c*) illustrate single element measurement, and FIGS. 7(*d*) and 7(*e*) show measurement of two elements. FIG. 7(*a*) shows monitoring one element of a set mass number m in which the mass analyzer 17 is kept set for the mass number $m_1$ when monitoring the clean air specimens of $t_1$ to $t_2$ and $t_3$ to $t_4$, the standard specimen at $t_2$ to $t_4$, and the sample at $t_4$ to $t_5$. In order to prevent the quantitative accuracy from being decreased by possible deviation of the mass number due to drift or similar causes, scanning should be preferably made on the mass numbers around $m_1$ a little before $t_1$ and $t_5$ to detect the $m_1$ peak to set the analyzer to the correct peak position. This is indicated by the zig-zag portions of the line of FIG. 7(*a*).

FIG. 7(*b*) is another quantitative measuring method in which scanning is not fixed on the particular mass number, but continuously repeat scanning is performed to find peak intensities of the mass spectra. This method allows background correction to be made at any time and the mass number calibration to be executed easily, but provides a lower signal than the method of FIG. 7(*a*).

FIG. 7(*c*) is a measuring method which is the same as the example in FIG. 7(*b*) except that data is collected by a plurality of scannings in a single measurement period. This allows for a signal which changes with time. The data obtained can be processed statistically.

FIG. 7(*d*) is an example of a measuring method similar to that in FIG. 7(*a*) except a plurality of elements, specifically two elements of mass numbers $m_1$ and $m_2$, are detected. The two mass numbers of the ions are monitored repeatedly one after the other. It should be noted that scanning occurs above and below $m_1$ and $m_2$ to calibrate the mass numbers a little before period $t_1$ to $t_2$.

FIG. 7(*e*) is a measuring method which is the same as that of FIG. 7(*b*) except that a plurality of elements is monitored. The methods of FIGS. 7(*d*) and 7(*e*) can be used similarly for three or more elements.

The mass number scanning method described above is adapted for the spectroscopic analyzing method by replacing the mass number by the wavelength.

What is claimed is:

1. A method of analysis of a specimen gas containing at least one impurity comprising the steps of feeding said specimen gas in undiluted form to a plasma and analyzing said plasma for said impurity, said plasma being formed by gases fed to it via an inner tube and at least one outer tube around said inner tube, said the specimen gas being fed via said inner tube and a second gas being fed via said outer tube for maintaining said plasma stable, said specimen gas and said second gas having compositions which are the same as to at least 75% by volume.

2. A method according to claim 1 wherein at least one of before and after said specimen gas is fed to said plasma and without interruption of said plasma, a third gas for analysis calibration is fed to said plasma via said inner tube, said third gas having a known concentration of said impurity and having a main composition which is substantially the same as the main composition of said specimen gas.

3. A method according to claim 1 wherein said plasma is a microwave induced plasma.

4. A method according to claim, 1 wherein said specimen gas is selected from the group consisting of air and nitrogen.

5. A method according to claim 1 wherein said plasma is analyzed by mass spectroscopy.

6. A method according to claim 1 wherein said plasma is analyzed for at least one element selected from the group consisting of sulfur, boron, chlorine, fluorine, phosphorus, aluminum and arsenic.

7. A method of analysis of a specimen gas containing at least one impurity comprising the steps of feeding said specimen gas in undiluted form to a plasma and analyzing said plasma for said impurity, said plasma being formed by gases fed to it via an inner tube and at least one outer tube around said inner tube, said specimen gas being fed via said inner tube and a second gas for maintaining said plasma stable being fed via said outer tube, said second gas being selected from the group consisting of air and nitrogen, and said specimen gas and said second gas having compositions which are the same as to at least 75% by volume.

8. A method according to claim 7 wherein said specimen gas is also selected from the group consisting of air and nitrogen.

9. A method according to claim 7 wherein said specimen gas is air and said impurity analyzed is sulfur and, without interruption of said plasma, said specimen gas, a third gas for analysis calibration which is standard air containing sulfur in a known concentration, and a fourth gas being used as a blanking gas for adjusting of a zero point in the analysis and which is desulfurized air, are fed in a sequence through said inner tube to said plasma, while said second gas which is selected from air identical to said specimen gas and said desulfurized air are fed via said outer tube.

10. A method according to claim 7 wherein said specimen gas and said second gas both originate from one atmospheric pressure, and while said second gas is fed to said plasma, a third gas for analysis calibration is fed to said plasma via said inner tube at least one of before and after said specimen gas without interruption of said plasma, said third gas having a known concentration of said impurity.

11. A method according to claim 7 wherein said plasma is a microwave induced plasma.

12. A method of analysis of a specimen gas containing at least one impurity comprising the steps of feeding said specimen gas in undiluted form to a microwave induced plasma and analyzing the plasma for said impurity, said plasma being formed by gases fed to it via an inner tube and at least one outer tube around said inner tube, said specimen gas being fed via said inner tube and a second gas for maintaining said plasma stable being fed via said outer tube, said specimen gas and said second gas having compositions which are the same as to at least 75% by volume.

13. A method according to claim 12 wherein said specimen gas and said second gas have substantially the same main composition.

14. A method according to claim 12 wherein said specimen gas and said second gas are selected from the group consisting of both air and both nitrogen.

15. A method of analysis of a specimen gas containing at least one purity comprising the steps of feeding said specimen gas in undiluted form to a microwave induced plasma and analyzing said plasma for said impurity, said plasma being formed by gases fed to it via an inner tube and at least one outer tube around said inner tube, said specimen gas being fed via said inner tube and a second gas for maintaining said plasma stable being fed via said outer tube, said specimen gas and said second gas having compositions which are the same as to at least 75% by volume.

16. A method of analyzing a specimen gas containing at least one impurity comprising the steps of feeding gases including said specimen gas to a plasma and analyzing said plasma for said impurity, said plasma being formed by said gases fed to it via an inner tube and at least one outer tube around said inner tube, said specimen gas being fed through said outer tube while, without interruption of said plasma, said specimen gas and at least one further gas for analysis calibration and having a known concentration of said impurity are fed to said plasma via said inner tube in a sequence.

17. A method according to claim 16 wherein said at least one further gas fed via said inner tube to said plasma includes two gases, of which one contains none of said impurity and the other has a known non-zero concentration of said impurity.

18. A method of monitoring concentration of at least one impurity in an atmosphere selected from the group consisting of air and nitrogen using a plasma analyzer having means for forming a plasma including an inner tube and an outer tube around said inner tube for feeding gas to a plasma region and means for analyzing amounts of said impurity in said plasma, said method comprising continuously feeding gases via said tubes while maintaining said plasma, all the gas fed to each tube respectively having substantially the same main composition, and all the gas fed to the two tubes having the same composition as to at least 75% by volume, there being a plurality of gases fed to a first one of said tubes in a repeating sequence comprising at least (a) a first gas comprising gas taken from said atmosphere and (b) at least one second gas comprising a gas having a known concentration of said impurity.

19. A method according to claim 18 wherein in said repeating sequence, the duration of feeding of said first gas via said first tube is at least two-thirds of the total time.

20. A method according to claim 18 wherein said first tube is said inner tube.

21. A method according to claim 20 wherein a gas having the same main composition as said atmosphere but not containing said impurity is fed continuously to said plasma through said outer tube while said repeating sequence of gases is fed via said inner tube.

22. A method according to claim 20 wherein gas taken from said atmosphere is fed continuously to said plasma through said outer tube while said repeating sequence of gases is fed via said inner tube.

23. A method according to claim 20 wherein said first gas consists of gas from said atmosphere and said second gas consists of a mixture of gas taken from said atmosphere and said gas containing a known concentration of said impurity.

24. A method according to claim 20 wherein the same sequence of gases is fed through said outer tube as through said inner tube and at the same respective times, said first gas of said sequence consisting of gas taken from said atmosphere and said second gas consisting of said gas having a known concentration of said impurity.

25. Apparatus for analyzing an impurity in a gas, comprising (a) means for forming a plasma at a zone therein including a multiple tube structure for delivering at least two different gases simultaneously to the plasma zone, said tube structure comprising an inner tube and at least one outer tube around said inner tube, (b) means for analyzing said plasma for said impurity, (c) gas conduits having flow regulating means connected to said inner and outer tubes and arranged for supplying said two different gases thereto selectively from at least two gas sources including a source of said gas having said impurity to be analyzed, (d) control means for said flow regulating means and arranged to cause a sequence of gases to flow to said plasma through at least said inner tube while said plasma is maintained continuously, said sequence of gases including feeding said gas having said impurity to be analyzed in undiluted form.

26. Apparatus according to claim 25 wherein said plasma forming means includes a microwave radiation generator and a waveguide for transmitting microwave radiation therefrom to said plasma zone.

27. Apparatus according to claim 25 wherein said analyzing means is a mass spectrometer for ions produced in said plasma.

* * * * *